UNITED STATES PATENT OFFICE.

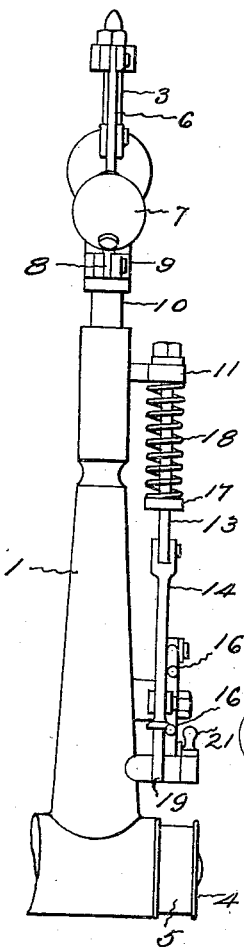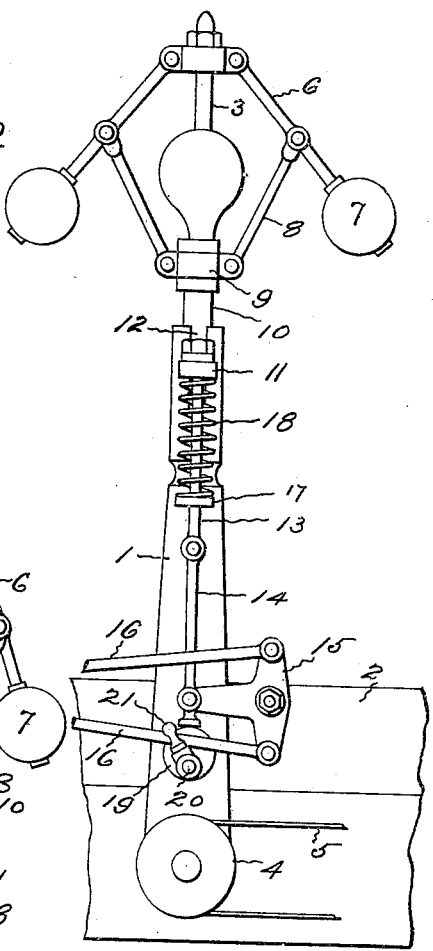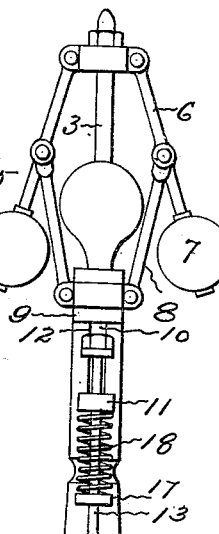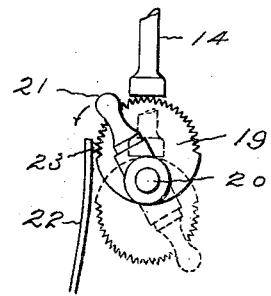

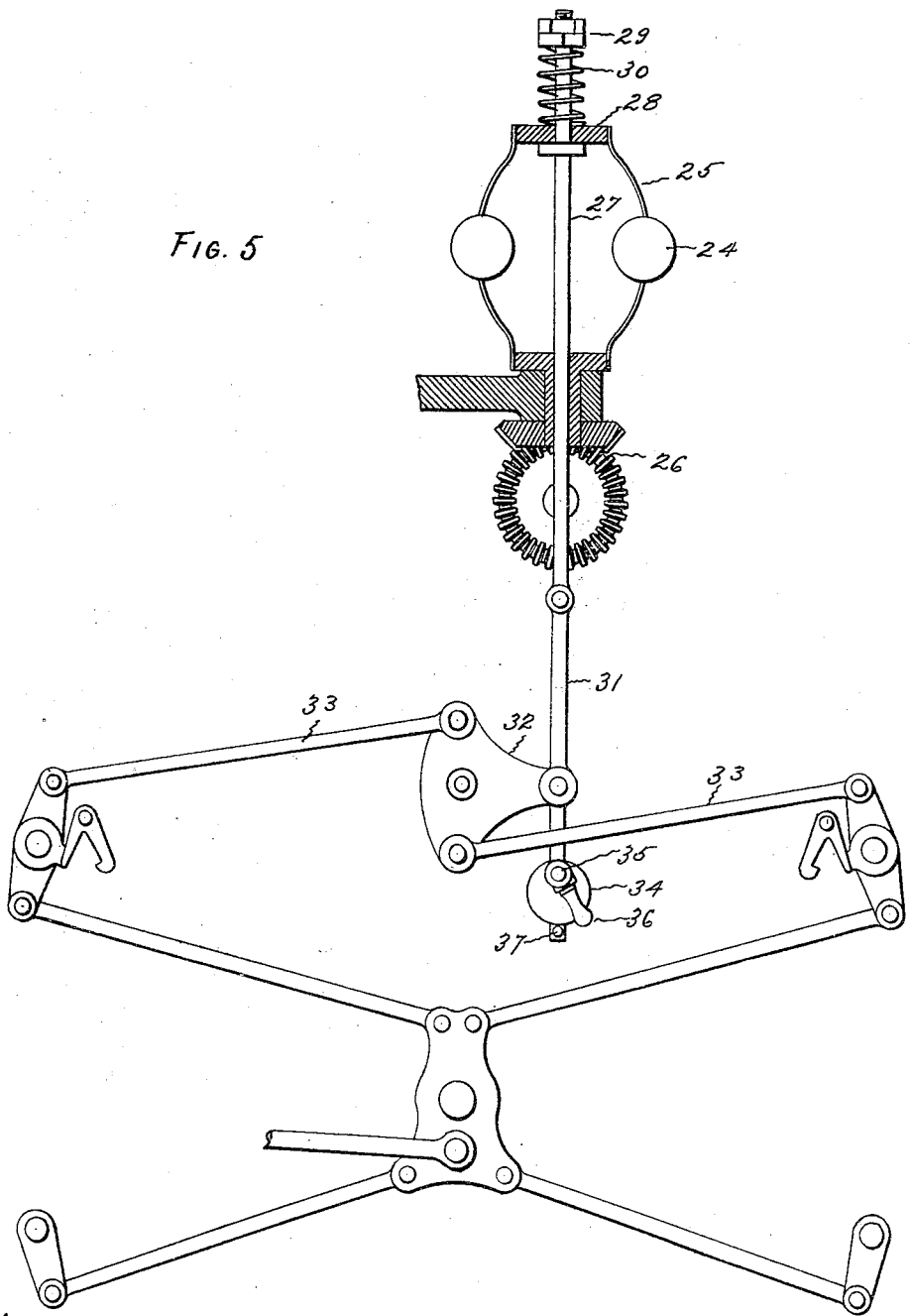

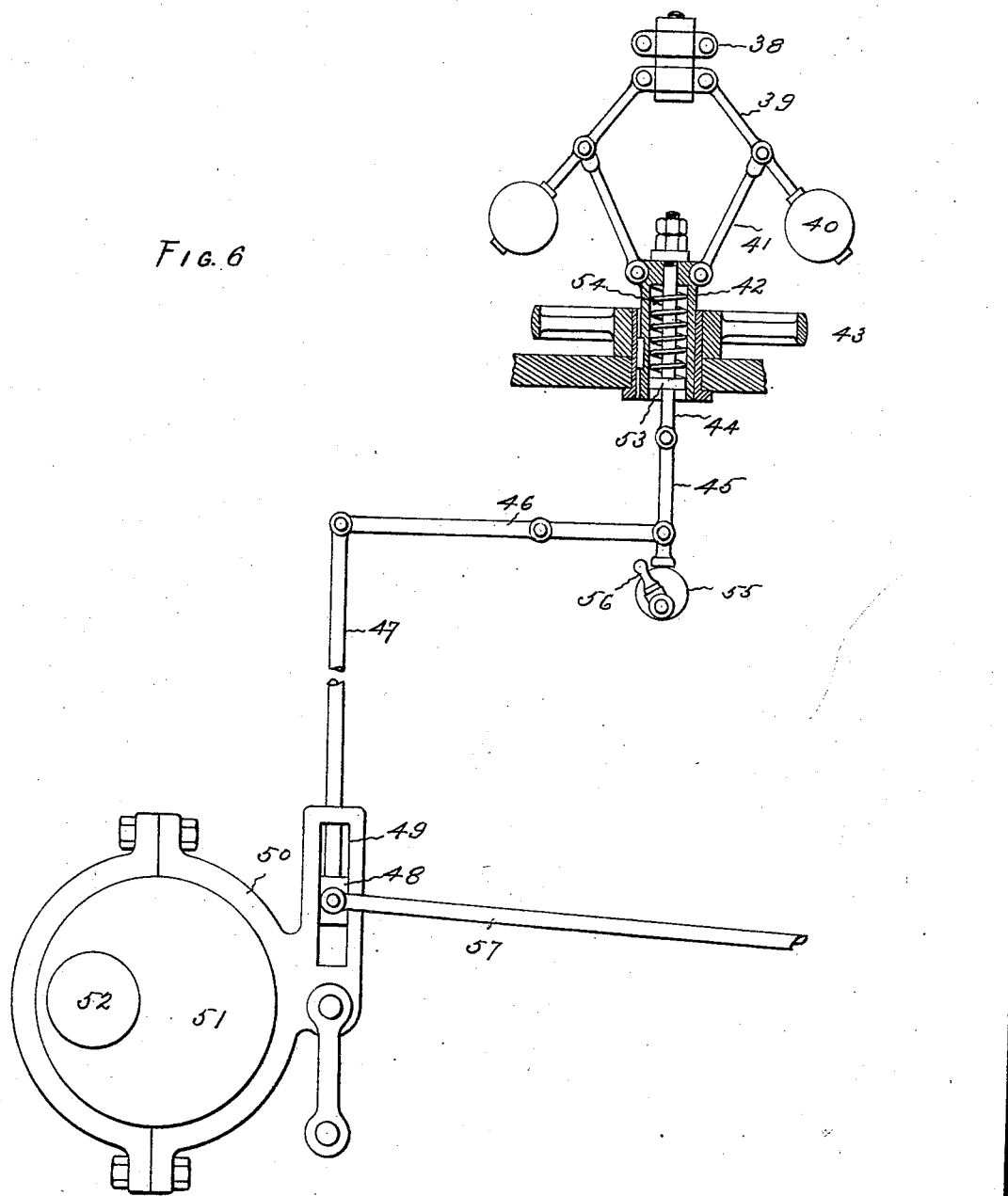

EBENEZER HILL, OF NORWALK, CONNECTICUT.

ENGINE-GOVERNOR.

931,870.  Specification of Letters Patent.  Patented Aug. 24, 1909.

Application filed February 3, 1909. Serial No. 475,850.

*To all whom it may concern:*

Be it known that I, EBENEZER HILL, a citizen of the United States, residing at Norwalk, in the county of Fairfield and State of Connecticut, have invented a new and useful Engine-Governor, of which the following is a specification.

This invention relates to steam engine governors, and more particularly to that class of governors which are used with engines provided with automatic cut-off mechanism for controlling the admission of steam to the cylinder or cylinders.

In an automatically governed steam engine every condition that tends to effect a change in the speed of the engine will cause a change in the point of the cut-off of steam, that is, if the engine speed increases, as a result of reduction of load, the steam is automatically cut off sooner, and if the speed decreases, as a result of increased load, the cut-off occurs later or farther along in the stroke, until the speed becomes so slow that the steam will enter the cylinder during practically the entire stroke of the piston. In factory engines, where uniform speed is requisite, this governing action is very desirable, and it is also desired in pumping and hoisting engines, when these are running at their full load and maximum designed speed. With these engines, however, there are frequent periods when it is desired to run the engines slowly, and this is effected by a partial closing of the steam throttle valve. The ordinary action of the common automatic governor would be, under these circumstances, to cause the steam to follow the full stroke, and thus necessitate an excessive throttling and a wasteful use of the steam.

The object of this invention is to provide means whereby the action of the governor may be limited at times when the engine is run at less than normal speed and it is not desired to have the cut-off extended so that the steam will follow the full stroke of the piston, and thus when the engine is run slowly to effect an economy in the use of steam. This object is attained by providing an adjustable stop, arranged so that it may be set to limit the action of the governor spindle, and prevent the governor from delaying the cut-off of steam when it is desired to run the engine slowly without excessive throttling. In other words, the parts are so constructed and arranged that a stop may be moved into the path of the governor spindle and adjusted so as to prevent the lengthening of the cut-off beyond the desired economical point, and then the speed of the engine can be regulated as desired by the use of a throttle valve exactly the same as in the case of an engine with a fixed cut-off.

This improvement can be readily adapted to any common type of governor located in any usual relation with the valves, and may be used with any form of automatic valve cut-off mechanism, without exercising invention. Three different forms of governors and three different arrangements of cut-off mechanism are shown and described herein as illustrating the invention and its use.

Figure 1 of the accompanying drawings shows a side elevation of a governor embodying the improvement, and designed to be applied to an engine having the Corliss type of valve mechanism. Fig. 2 shows a front elevation of the same with the governor balls open to the positions they occupy when the engine is running at normal speed, and the adjustable stop of the present invention arranged to prevent a decrease of engine speed from causing a lengthening of the cut-off. Fig. 3 shows a side elevation of the same, with the balls dropped, as results from decrease of speed, and the parts held by the stop so as to prevent the extension of the cut-off. Fig. 4 shows a detail view of the adjustable stop, indicating the positions to which it may be turned, and a means for retaining it in the several positions. Fig. 5 shows the invention adapted to a different form of governor, which is connected in another manner, with a Corliss valve gear of common type. Fig. 6 shows a side view of the invention designed for another type of governor, and connected with an engine gear which has the action of the steam valves controlled by an eccentric and link.

In the form first shown, the governor is represented as supported by a column 1 mounted on the frame 2 of the engine. The spindle 3 of this governor extends through the column and is designed to be rotated by the ordinary mechanism driven by the pulley 4 and belt 5. The levers 6, when oscillated by the walls 7, under the influence of centrifugal force, through the links 8 and collar 9, raise and lower the sleeve 10 which moves on the spindle at the top of the column. An arm 11 projects from this sleeve through a slot 12 in the top of the column. This construction permits the sleeve to move vertically without being rotated. Extending loosely through the arm 11 is a rod 13 which is connected by a link 14 with the rocker lever 15, to the arms of which are connected the rods 16 which reach to the intake valve cut-off mechanism of the engine.

Fastened on the rod 13 is a collar 17, and placed between this collar and the arm 11, that projects from the sleeve 10, is a spring 18. Beneath the end of the link 14, that connects the rod 13 with the rocker lever 15, in the form first shown, is a disk 19 eccentrically mounted on a shaft 20 that can be turned by a handle 21. If desired, as shown in Fig. 4, the periphery of this disk may be provided with notches, and a spring arm 22 with a tooth 23 may be arranged to engage these notches to hold the disk in the position to which it is adjusted.

When the engine is to be run under normal conditions this disk is turned to the position shown in dotted lines in Fig. 4. In this case the governor is free to act as any automatic cut-off governor, that is, when the speed of the engine increases, the governor balls are raised and, through the connections, the rocker lever is turned so that the steam is cut off quicker, and when the balls drop, as a result of a slower speed of the engine, through the connections, the rocker lever is turned so that the valves will allow the steam to act longer on the piston. The spring is sufficiently stiff to form, under these normal conditions, a practically rigid connection between the parts that join the rocker lever with the governor sleeve. With the present invention, however, if it is desired to run the engine more slowly than normal, that is, to reduce its normal speed, without allowing the governor to delay or lengthen the cut-off, the handle 21 is moved so that the eccentric disk will be turned upwardly the desired amount into the path of the lower end of the link 14. This holds up the link and rod and permits the governor balls to drop, the spring yielding as shown in Fig. 3, without moving the rocker lever so as to cause the cut-off to be lengthened and the speed to be increased. Such an arrangement of adjustable stop and elastic connection between the governor and the rocker lever which moves the reach rods, permits the engine to run at slow speed and still cut off early in the stroke, notwithstanding the fact that the governor is down in the position for cutting off late in the stroke. When the eccentric disk, which acts as a stop, is turned around so that its low point is up, it does not interfere with the normal action of the governor. By turning the disk up the necessary degree the lengthening of the cut-off is prevented beyond the desired point, and the speed of the engine can then be regulated by the use of the throttle valve. As the weight or force pressing downwardly upon the stop disk is only the slight weight of the spindle, and the small force of a light spring, the stop holds up the weight of the spindle only, not the entire weight of the governor, and the stop can be easily adjusted at any time while the engine is idle or running.

In the mechanism shown in Fig. 5, the balls 24 are mounted on flexible spring arms 25, as in a common form of governor. This governor is rotated by the bevel gears 26 which are driven in any suitable manner. The spindle 27 extends loosely through the plate 28 at the upper end of the governor, and between this plate and the nuts 29 is a spring 30. The lower end of the spindle 27 is connected by a link 31 with a rocker 32 which is connected by rods 33 with ordinary Corliss valve cut-off mechanism. The position of this rocker, as is usual, determines the time when the admission valves close.

A stop in the form of an eccentric disk 34 is pivoted on a shaft 35 which is provided with a handle 36. This stop is adapted to be turned into the path of a stud 37 projecting from the lower end of the link 31. When the handle of the stop is turned up and the periphery of the disk is turned out of the path of the pin, the governor acts normally. That is, when the governor balls are thrown out under centrifugal action, due to the speed of rotation, the spindle is forced down in such manner as to turn the rocker in the usual way to quicken the cut-off. When the balls come together, as under less rapid rotation, the spindle is lifted and the rocker turned so as to delay the cut-off. In this manner, under the usual conditions, the normal speed of the engine is maintained. When it is desired to have the engine run slow and yet not delay the cut-off, the handle is turned so that the stop is brought to the desired degree into the path of the stud at the lower end of the link that is connected with the rocker. This prevents the spindle from being lifted when the governor balls retract, due to the slow speed, and consequently holds the rocker so that the cut-off is not delayed.

The two forms of governors previously described are illustrated as designed to be used with Corliss valve mechanism. The invention is equally applicable for controlling the action of a governor on an eccentric and link valve mechanism. The top of the governor shown in Fig. 6 is illustrated as designed to be supported by a bracket 38. The levers 39 with their balls 40 and the links 41 which connect the levers and the sleeve 42, are designed to be rotated by a pulley 43. A rod 44 extends loosely through the sleeve 42. This rod is connected by a link 45 with a lever 46 which, by a rod 47, is connected with the block 48 in the link 49. This link is attached to the eccentric strap 50 of the eccentric 51 on the shaft 52. Pivoted to the block 48 is the valve rod 57. In the sleeve 42, and placed between its upper end and the collar 53 on the rod 44, is a spring 54. Below the end of the link 45 is an adjustable stop 55 provided with a handle 56.

When it is intended to run the engine at its normal speed and to allow the governor complete control, the handle is turned downward so that the stop does not interfere with the motion of the link and the rod connected with the sleeve, which is raised and lowered by the governor. Under these conditions, as the balls move outward when rotated rapidly, the sleeve is lifted and this, through the rod 44, link 45, lever 46 and rod 47, moves the block 48 in the link 49, so the steam is cut off sooner. As the balls move inward under less rapid rotation the block 48 is moved so the cut off is delayed. If it is desired to have the engine run slowly, without increasing the cut-off, thus economizing steam, the handle of the stop is turned upwardly to the position shown in Fig. 6, and then the eccentric disk extends into the path of movement of the link 45 and prevents the governor when running slowly, from acting on and changing the position of the center of the block to which the valve rod is connected.

Any type of governor may be used, and any form of valve operating mechanism may be employed with this invention. It is only essential that there be a yielding connection between the governor and the valve cut-off mechanism, and a stop which can be turned into or out of the path of movement of one of the parts of the cut-off mechanism, to obstruct the action of that mechanism under the influence of the governor, to the desired degree.

The invention is not limited to the specific form of adjustable stop, nor to the means for retaining it in the position to which it is adjusted, shown and described herein, as other forms of stop will readily suggest themselves to the engineers familiar with this art, although the means shown for this purpose are simple and effective.

The invention claimed is:

1. In governor mechanism for engines, the combination of a speed responsive device, mechanism controlling the admission of fluid to the engine, yielding mechanism for transmitting the motion of the speed responsive device to the mechanism controlling the admission of fluid to the engine, and a stop adapted to be moved into the path of a part of said mechanism for transmitting the motion of the speed responsive device for the purpose of limiting the action of the speed responsive device on said controlling mechanism, without interfering with the free movement of the speed responsive device throughout its entire range, and to be moved out of the path of said part and permit the speed responsive device to control said mechanism.

2. In governor mechanism for engines, the combination of mechanism for transmitting the motion of the speed-responsive device to the mechanism controlling the admission of fluid to the engine including a yielding connection, and an adjustable stop adapted to be moved into and out of the path of a part of said transmitting mechanism between said yielding connection and said admission-controlling mechanism to limit the movement thereof.

3. The combination of an engine governor, a valve cut-off mechanism, an adjustable stop adapted to be moved into and out of the path of a part of the cut-off mechanism, and a yielding connection between said governor and the part of the cut-off mechanism affected by the stop.

4. In combination with an engine governor, mechanism for controlling the cut-off of intake valves, a spindle, means yieldingly connecting the spindle and the governor, and an adjustable stop adapted to be moved into the path of the spindle to determine the amount of movement thereof under the influence of the governor.

EBENEZER HILL.

Witnesses:
E. D. WILDMAN,
A. N. WILDMAN.